(12) United States Patent
Sibert et al.

(10) Patent No.: US 6,184,863 B1
(45) Date of Patent: Feb. 6, 2001

(54) DIRECT POINTING APPARATUS AND METHOD THEREFOR

(75) Inventors: John L. Sibert, Falls Church; Mehmet Gokturk, Vienna, both of VA (US)

(73) Assignee: The George Washington University, Washington, DC (US)

(*) Notice: Under 35 U.S.C. 154(b), the term of this patent shall be extended for 0 days.

(21) Appl. No.: 09/170,039

(22) Filed: Oct. 13, 1998

(51) Int. Cl.[7] ....................................... G09G 5/00
(52) U.S. Cl. .................. 345/156; 345/156; 345/157; 345/158; 345/159; 345/163; 345/179; 345/180; 345/182; 345/183
(58) Field of Search ..................... 345/158, 157, 345/163, 180, 156, 159, 179, 182, 183, 8

(56) References Cited

U.S. PATENT DOCUMENTS

| | | | |
|---|---|---|---|
| 4,345,248 | 8/1982 | Togashi et al. | 340/784 |
| 4,565,999 | 1/1986 | King et al. | 340/706 |
| 4,682,159 | 7/1987 | Davison | 340/709 |
| 4,688,933 | 8/1987 | Lapeyre | 356/1 |
| 4,862,152 | 8/1989 | Milner | 340/712 |
| 4,988,981 | 1/1991 | Zimmerman et al. | 340/709 |
| 5,009,501 | * 4/1991 | Fenner et al. | 356/152 |
| 5,367,315 | 11/1994 | Pan | 345/156 |
| 5,444,462 | 8/1995 | Wambach | 345/158 |
| 5,448,261 | 9/1995 | Koike et al. | 345/158 |
| 5,459,489 | 10/1995 | Redford | 345/179 |
| 5,554,980 | 9/1996 | Hashimoto et al. | 340/825 |
| 5,627,565 | 5/1997 | Morishita et al. | 345/158 |
| 5,638,092 | * 6/1997 | Eng et al. | 345/158 |
| 5,673,087 | 9/1997 | Choi et al. | 348/511 |
| 5,675,361 | 10/1997 | Santilli | 345/168 |
| 5,796,387 | 8/1998 | Curran et al. | 345/158 |
| 5,900,863 | * 5/1999 | Numazaki | 345/158 |

FOREIGN PATENT DOCUMENTS

| | | |
|---|---|---|
| 1245782 | 11/1988 | (CA) . |
| 0123043 | 10/1984 | (EP) . |
| 0209411 | 1/1987 | (EP) . |
| 60-138628 | 7/1985 | (JP) . |
| 60-263223 | 12/1985 | (JP) . |
| 2-268315 | 11/1990 | (JP) . |
| 3-17696 | 1/1991 | (JP) . |
| WO 92/09983 | 6/1992 | (WO) . |

* cited by examiner

Primary Examiner—Richard A. Hjerpe
Assistant Examiner—Jean Lesperance
(74) Attorney, Agent, or Firm—Antonelli, Terry, Stout & Kraus, LLP (57) ABSTRACT

The direct pointing apparatus and method therefor has a light sensing arrangement including a plurality of light receivers positioned around the outer periphery of a computer display and A/D interface circuitry coupling the light receivers to a host computer (laptop CPU) for processing converted digital values which are based on the IR intensities received by the light receivers from the directed light emitter. In accordance with this scheme, the location on the display to where the light emitter is pointing is computed from the intensities of light being sensed by the light receivers, the computing of the location being substantially independent of the distance of the light emitter from the light sensing arrangement. In one example, the incoming signals to the A/D interface circuitry from the light receivers are continuous and in parallel while the output of the A/D converter is an asynchronous serial signal. The resulting converted digital values are transmitted to the host computer/laptop CPU for processing by the host program. This scheme is also applicable with interactive television in substantially the same way, although the light emitting pointer circuitry would be incorporated instead into the remote controller of the television.

32 Claims, 5 Drawing Sheets

DIRECT POINTING APPARATUS AND METHOD THEREFOR

BACKGROUND OF THE INVENTION

I. Field of the Invention

This invention relates, generally, to the field of computer-related peripheral devices used for data entry through directly pointing the devices to a target location on the screen and, relates, more particularly, to an improved apparatus and method therefor which is used to locate the position on the display of a computer or interactive television where the pointer, i.e., pointing device, is aimed at.

II. Description of the Prior Art

Computer-related peripheral devices such as pointers (or input devices) include, for example, keyboards, joysticks, mice, trackballs, light pens, styli, etc. A function of such pointers is to position a cursor at a desired location on the computer display. Once the target position is located by the cursor, the computer can then be instructed to perform an operation such as to perform a menu selection or a function which selects a computer application program or, for that matter, perform icon/menu selection or web-browsing as it relates to interactive television (WEB TV). It is interesting to note, however, that pointing devices such as mice, styli, trackballs, joysticks, etc., have little or nothing in common with natural pointing. In fact, such conventional cursor locating devices are not very convenient to use as a pointer for moving the cursor to a target location. For example, the computer mouse is not convenient in cursor movement noting that the user must move the mouse over the area on a mouse pad or on a flat surface through repeated interruptive movement of the user's arm. As to mobile computing, certain constraints on pointers or input devices that are not present in typical work station environments are present. For example, in laptop computers, pointers or input devices cannot be too large or too expensive and they must be contained within the mobile unit (e.g., laptop) or easily attached to it. The input devices most frequently available with notebook computers such as laptops, for example, trackballs, scratch pads and isometric joysticks, satisfy such constraints but, however, are still used in a relatively difficult manner as indirect pointers which most users, it is believed, find less than fully satisfactory.

Attempts have been made earlier to alleviate the difficulties and problems associated with indirect pointing devices such as those mentioned above. One example is disclosed in Japanese laid-open application publication No. 2-268315, published Nov. 2, 1990. According to the scheme disclosed therein, a cursor is moved to a target position on the computer display by following the coordinate position aimed at a track pad. Although a finger-mounted LED is used as a pointer so as to allow the computer operator to easily set the desired coordinates without releasing his or her hand from the keyboard, such pointing scheme, nonetheless, is still an indirect attempt at setting the coordinates of the target position on the computer display. This is because the finger-mounted pointer is aimed at a position on the secondary plane-shaped light reception part (i.e., a tracking pad), which reception part or tracking pad is arrayed with an infrared (IR) photodetection scheme.

Practically speaking, such an IR responsive pad is used in a manner analogous to a "track pad", to control the relative motion of a cursor on the screen. Such an approach to a pointing device is somewhat clumsy as well as being an indirect pointer. For one, the computer user must aim the finger-mounted LED on the track pad and not on the display and, at the same time, follow the movement of the cursor on the computer display to make sure the cursor moves to the target position. This takes away from the natural benefit one would receive from pointing directly at the display using one's finger as a pointer. Also, employing a separate track pad which is infrared (IR) responsive requires a dense array of sensors and, presumably, must necessarily employ a rather sophisticated control algorithm involving an extra switch used for "clutching" to set the X-Y coordinates of the target position on the screen. The dense array of sensors and the separate track pad also requires an unnecessary expense in addition to a more sophisticated control algorithm.

Many other input device (pointer) schemes have developed over the years. However, such pointers are either functioning as indirect pointers or are associated with a complicated control algorithm in addition to being quite costly to implement. As an example of such prior schemes, U.S. Pat. No. 5,009,501 discloses using a gun as a pointer for an interactive video game (see FIG. 8 of that patent). The emitter of the gun pointer, which emits a field of ultrasonic radiation, is directly pointed to a target on the screen which target is sensed by the ultrasonic receivers around the outer periphery of the TV screen. However, in order to determine the target location on the screen that the gun is aiming at, it is necessary to employ a control algorithm that not only considers the intensities of the detected radiation by the sensors but also the relative angles as well as the range (distance) between the ultrasonic frequency transmitter and the ultrasonic sensors. This patent also discloses schemes in which the signal is a pulsed IR signal. However, in each of the disclosed embodiments in that patent, which employs IR radiation, at least two LED transmitters are employed—one transmitting an IR signal having a wide field of radiation and the second transmitting an IR signal having a narrow field of radiation. In such instances, also, the algorithm that would be required must take into account the distance between the emitter and receiver. In FIG. 9 of that patent, the scheme employed has a directional source comprised of three LEDs which point to three different directions in relation to the screen so as to generate information along two different planes. Such is considered quite cumbersome and would typically involve also the measuring of distance to determine the intensities of the signals received. Such a scheme as that taught in U.S. Pat. No. 5,009,501 is especially suited for determining the relative position of two bodies and their relative orientation.

U.S. Pat. No. 5,367,315 discloses a cursor control scheme using IR frequency signals. Although this microprocessor controlled IR light based system avoids some of the disadvantages typified by the mouse or other classically inefficient peripheral components, control of the cursor movement is effected through movement of the computer user's eyes and head, which movement is sensed by a plurality of light sensors positioned around the screen. In order to implement such a scheme, an array of transmitters are required along with an array of receivers around the display screen and this requires additional filtering to remove noise of the detected IR signal from the surrounding light reflections. This scheme is quite complicated and further requires multiplexing. Also, this scheme must consider not only movement of the head but also movement of both eyes of the computer user. Consequently, the algorithm associated therewith becomes quite cumbersome.

W 92/09983, published Jun. 11, 1992, is directed to the tracking and displaying of a virtual object using a radio frequency signal. The displayed virtual object mimics a transmitter which is a glove assembly supporting a transmitting device which transmits cursor data related to gesture information at a radio frequency to four stationary receivers around the display. The received RF signal is converted to a digital signal and is processed by a microprocessor. The software employed is such that the position of the virtual object is calculated based on the strength of the signal received and that the movement of the virtual object shown on the display is in the same direction as and is proportional to the object movement. With regard to this, an averaging method is employed to determine the object position. RF signals are effected by distance and, therefore, the tracking scheme employed is dependent on distance between the display and the glove assembly. Also, movement on the screen is proportional to movement of the glove assembly. Said differently, this RF tracking scheme tracks the location of the glove assembly and cannot be considered in the same sense as that of a direct pointer scheme which locates the X-Y coordinates of the target position the pointer is aimed at on the screen.

SUMMARY OF THE INVENTION

It is a main objective of the present invention to provide a direct pointing apparatus and method therefor for interaction with computers as well as interaction with multimedia television (including interactive television, i.e., WEB TV) which avoids by simple means the aforementioned shortcomings and disadvantages associated with the prior art. (The term "computers" is inclusive of and not limited to personal computers and notebook computers.)

Another objective of the present invention resides in a direct pointing apparatus and method therefor for use with computers and interactive television which is both easy to use as well as being inexpensive.

A further objective of the present invention resides in a direct pointing apparatus having a receiver system which can be easily retrofitted to many existing displays in both computers as well as in interactive television (WEB TV) and which can, also, be built-into display housings at the time of manufacture thereof.

A still further objective of the present invention resides in a direct pointing apparatus and method therefor for use with computers and interactive television in which the target location on the display at which the input device (pointer) is aimed at can be easily calculated using a simple algorithm for computing the screen coordinates.

Another objective of the present invention resides in a direct pointing apparatus and method therefor which employs a simple, inexpensive light emitting module which can be worn by the computer user, for example, on the user's finger and, preferably, as a finger-mounted, ring-like pointing module for interacting with computers, such as PCs and notebook computers, although not limited thereto, so as to minimize an adverse impact on the computer user's typing performance as well as enhancing the pointer user's speed.

In their investigating efforts, the inventors have considered employing an array of light (IR) sensors to cover the entire area of the laptop screen during the manufacture thereof for use with a direct finger-mounted pointing scheme. Such an IR photosensitive matrix would necessarily be in addition to the existing array of, for example, LCD elements of the display. However, the inventors determined that such a scheme would be quite expensive to manufacture and, moreover, could not be installed in already existing laptops. Also, the inventors realized, such a light sensing array would be too difficult, if not impossible, to install in already built CRT type computer displays such as for personal computers or those at work stations since such a light sensing array must be built inside the display. The inventors, therefore, considered this as too limiting and expensive.

The aforementioned shortcomings and disadvantages, although not limited thereto, are overcome and the above-mentioned objectives are also achievable in accordance with a direct pointing apparatus and method therefor of the present invention. In their investigative efforts for achieving an improved direct pointing apparatus and method therefor which can overcome the problems noted above, the inventors have indeed determined that infrared (IR) light is especially useful in pointer applications and such IR signal communication can be cheaply effected through use of, for example, light emitting diodes as the light emitters and IR light-activated devices, such as photodiodes and phototransistors and the like, as the light receivers (sensors). Moreover, the inventors determined that an IR signal, for example, is preferable because of its relative ease to use in processing information based on sensed IR signal values and can be made directional while, at the same time, ambient light disturbances can be easily filtered out.

In an attempt at devising a system which is deployable in both already built computers and interactive televisions and which can also be installed during the production stage of computers and interactive televisions, the inventors have schemed a direct pointing apparatus and method of operating the same which employs a direct pointer (direct pointing device) having a light emitter and a receiver system having a light sensing arrangement including a plurality of light receivers positioned around the outer periphery of the display and interface circuitry. The interface circuitry couples the light receivers to the host computer CPU or laptop CPU for processing the converted signals which are indicative of values of signals outputted by the light receivers which, in turn, are indicative of the light intensities of the light signals (e.g., IR signals) received by the sensors. The interface circuitry filters ambient light and converts analog signals, indicative of signals outputted by the light receivers, into digital signals which are processed by the computer, through running a host program by the computer CPU, to determine X and Y coordinates of the target position, the X and Y coordinates, respectively, being a function of the values of the light intensities at the light receivers.

In accordance with the present invention, light emitting diodes and phototransistors are acceptable as the IR emitters and IR receivers (IR sensors), respectively, although other such devices having similar capabilities can be employed also. As to the plurality of receivers that are placed around the computer display, one preferred manner of electrically connecting them to the interface circuitry is to wire each sensor output separately to the interface circuitry, the interface circuitry can be facilitated with a plurality of channels each of which is associated with a corresponding light receiver (sensor). That is, during operation of the direct pointing apparatus, the interface circuitry responds to continuously received parallel signals from all of the light receivers that are disposed around the outer periphery of the display. In other words, each sensor is associated with its own interface circuitry unit which consists of an analog filter and A/D converter combination, the A/D converter can be effected within a microcontroller which can be a microprocessor. The A/D converter outputs digital values which are transmitted asynchronously to the CPU via a serial interface according to one preferred embodiment (although not limited thereto), and the CPU processes the digital values to determine the X and Y coordinates of the target position on the computer display or WEB TV screen. The location on the display at which the light emitter is pointing is computed from the digital values processed by the host computer (laptop CPU), which digital values are representative of the light intensities of light being sensed by the light receivers, the computing of the location on the computer display or WEB TV display being substantially independent of the distance of the light emitter from the light sensing arrangement.

According to the present invention, the light emitter which can be a battery-operated light emitting module (e.g., LED module or, more specifically, IR LED transmitter) is worn by the user of the computer and, preferably, is mounted on a ring-like member worn on the finger of the computer user so as to operate as a finger pointing device or direct pointer, the ring-like member can be any comfortably fitting elastic band or can be a band of Velcro material and with the light emitter fixedly mounted thereon. Such light emitting module which is used as a direct pointer when mounted on, for example, the index finger, can be easily and inexpensively manufactured. Likewise, the light sensing arrangement can be disposed along with the interface circuitry as a modular unit constituting a receiver system which can be retrofitted around the outer periphery of the computer display (WEB TV screen). The arrangement of the plurality of light receivers can be individually retrofitted at various locations around the outer periphery of the display. Alternatively, the receiver system can be built, into the housing of the display during the production stage of the display.

The ability to retrofit the receiver system to existing computer displays and WEB TV screens adds a further advantage of the present invention, namely, its portability which certainly cuts down the costs. The sensing arrangement can be disposed in a unitized frame or each light receiver can be contained in its own modular unit that can be disposed at a location on the outer periphery of the display, either as an externally disposed light receiver or one that is built into the display housing. Similarly, the interface circuitry can be built into the housing structure of the receiver system or be a separate component from the light sensing arrangement. Other possibilities are available in terms of retrofitting the receiver system to the computer display or with regard to implementing the receiver system in the computer display housing during the production stage thereof.

According to another featured aspect of the invention, the light sensing arrangement has at least one light receiver disposed at each side of the outer periphery of the computer display and, more preferably, has an additional light receiver disposed at each of the corner locations of the outer periphery of the computer display. The invention can also be implemented with light receivers arranged at each corner location of the outer periphery of the computer display.

Another featured aspect of the invention calls for application of the direct pointing apparatus to a notebook computer in which, also, the light emitting module is, preferably, mounted on a ring-like member worn on a finger of the computer user so as to operate as a finger pointing device. With regard to this, assuming the computer user's hand is positioned on the keyboard of a laptop and the user is pointing only with the index finger of one hand which is mounted with the IR light emitting module, it is apparent that the range of motion is more than sufficient to cover the area of a typical laptop screen. This is a clear advantage over the indirect pointer such as a mouse, trackball, scratch pad and isometric joysticks which require movement of the hand away from the keyboard and which also are, by their nature, clumsily manipulated. With regard to such finger pointing scheme as that presently called for, it has the effect of being a direct and absolute device, that is, it does not require a user to control a cursor indirectly.

According to the present invention, the X and Y coordinates of the target position on the screen are determined in accordance with the following relationships, operated on by the computer CPU under the control of a host program:

$$X = (1+K_X)P_X \cdot (I_R/(I_L+I_R)) - (K_X/2)P_X; \text{ and} \qquad (i)$$

$$Y = (1+K_Y)P_Y \cdot (I_B/(I_B+I_U)) - (K_Y/2)P_Y \qquad (ii)$$

where $P_X(P_Y)$=the horizontal (vertical) resolution in pixels of the display, $1+K_X(1+K_Y)$ is a constant multiplier that takes into account the additional pixel distance effected by the placement of the light receivers outside the pixel display area, $I_R(I_L)$=the sum of light intensities received by the light receivers located along the right vertical (left vertical) of the display, $I_U(I_B)$=the sum of light intensities received by the light receivers located along the upper horizontal (lower horizontal) of the display, the light intensity of each sensor having a normalized weight of from 0 to 1, and $(K_X/2)P_X((K_Y/2)P_Y)$=half the additional pixel distance along the X (Y) direction.

According to a further aspect of the present invention, the direct pointing apparatus and method therefor, as noted earlier, can be applied to interactive television (WEB TV). In this connection, the receiver system can be implemented in the same manner as that with regard to a computer display. However, as to the direct pointer, that can be facilitated within the remote control unit for the WEB TV. According to a computer application of the present invention, the light emitting module (e.g., an IR LED transmitter) is adapted to operate as a pointer aimed at a location on the computer display by being worn by the computer user such as on the index finger in the manner as earlier described. In connection with interactive television, however, a program controller such as a remote control device can be facilitated also as a direct pointing device through using an already built-in LED in the remote control device as a direct pointer. That is, the circuitry part of the light emitting diode of the direct pointer associated with the computer display can be designed into the remote control device circuitry and during operation of the pointer, it can be switchably connected through push-button control on the remote control device.

These and other featured aspects and advantages therefor of the present invention, which is defined by the appended claims, will become better understood with regard to the following detailed description as it relates to the exemplified embodiments.

DETAILED DESCRIPTION OF THE DRAWINGS

Figure 1:
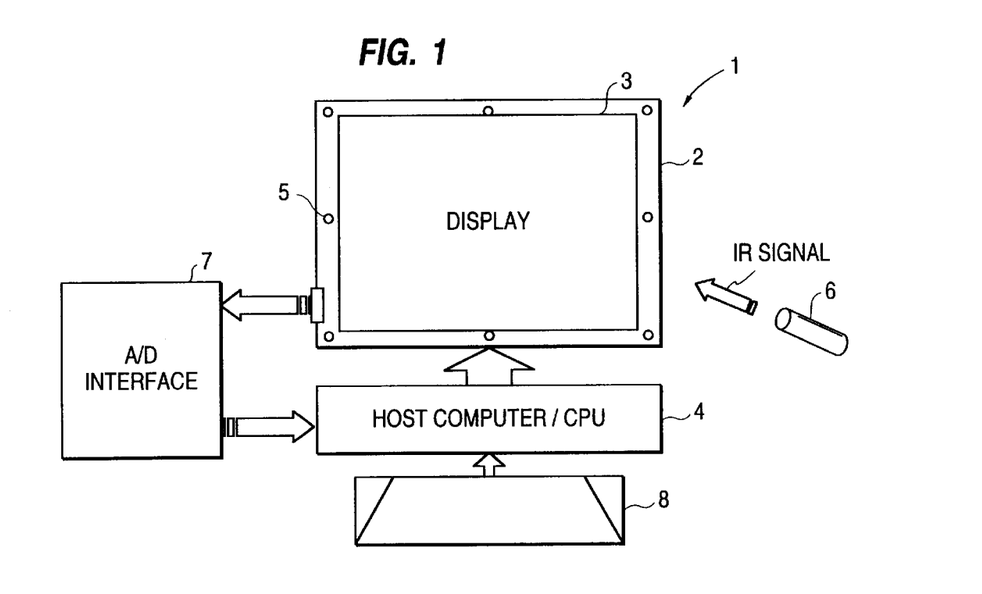
FIG. 1 is a schematic representation of application of a direct pointing apparatus to a computer, for example, personal computer or notebook computer, according to the present invention.

In FIG. 1, the direct pointing apparatus is applied to a computer system 1 which may be a personal computer having its own CPU or can be a work station for a computer user which is interactive with other stations and/or a main frame or can be a notebook computer (laptop), etc. In the illustration shown in FIG. 1, the computer system 1 has a display module 2 with a display (screen) 3 and also has a host computer 4 which has a built-in CPU for processing instructions, the processing being typically effected through a software program. Keyboard 8 is operated on by the computer user for sending instructions to be operated on by the host computer and/or for display on the screen 3.

This computer system is also facilitated with a direct pointing apparatus having a pointer 6 adapted to operate as a direct pointer aiming at a location on the computer display 3 while being worn by the user and having a receiver system constituted by (1) a light sensing arrangement having light receivers 5 positioned around the outer periphery of the display and (2) an A/D interface circuitry 7 which filters and converts signal values outputted by the light receivers 5 into digital signals to be processed by the host computer 4 for determining the X-Y coordinates of the target position being pointed to by the pointer 6. In this connection, the present inventors have determined that their pointing apparatus performs especially well when effected for use with infrared light signals (IR radiation), in which case, the pointer is constituted by a light emitting module which includes a directed light emitter, for example, an LED which emits light pulses in the IR frequency band. In order to solve some sensitivity to ambient light, the IR light pulses can be transmitted in, for example, a light beam modulated at 38 kHz, which modulation light beam frequency is well known. As to the light receivers 5, they are correspondingly constituted by infrared light-activating devices (e.g., phototransistors, photodiodes, etc.).

The receiving system, including the light sensing arrangement and the A/D interface 7 can be easily retrofitted to the computer display 3 in which case the A/D interface portion can be in the form of a separately packaged analog filter-microcontroller which can perform amplification, filtering and A/D conversion. The A/D interface 7 can be of the plug-in type responding to parallel incoming analog values from the outputs of the plurality of IR sensors 5, the plug-in type being a circuit board which is PCMCIA size feasible.

Alternatively, the circuit packaging associated with the analog filter and microcontroller can be retrofitted as an add-on to an existing card (printed circuit board). As to the light sensing arrangement, it can be retrofitted so that the light receivers (or light sensors) 5 can be dispersed in the manner as that shown in FIG. 1, for example. One such preferred light sensing arrangement employs IR responsive phototransistors as the individual sensors, in which case, the current output values associated therewith are indicative of the light intensities received by the light sensors, the current signal values from the light sensors being analog values which are amplified and filtered by the analog filter 21 and converted into digital signals by the A/D converter 23 in the microcontroller 22 (e.g., which can be a microprocessor).

Figure 2:
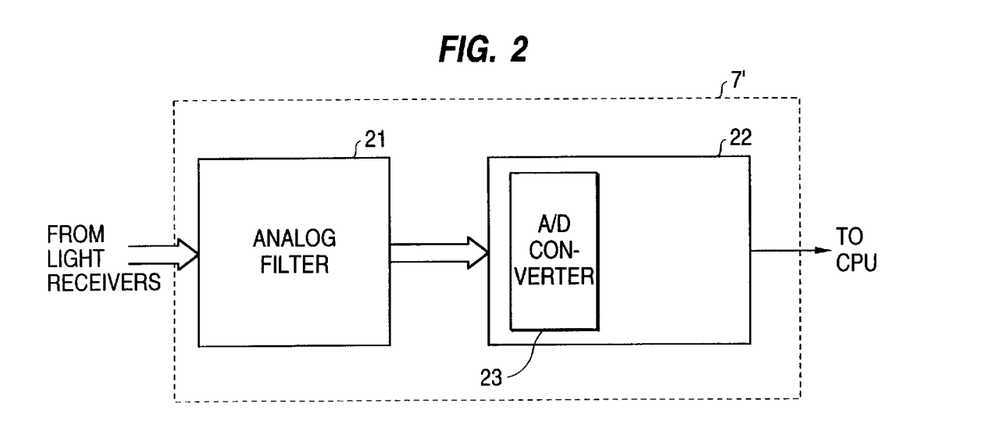
FIG. 2 is an example of a block representation of the component parts of the analog-to-digital (A/D) interface that can be employed in the apparatus shown in FIG. 1.
Figure 5:
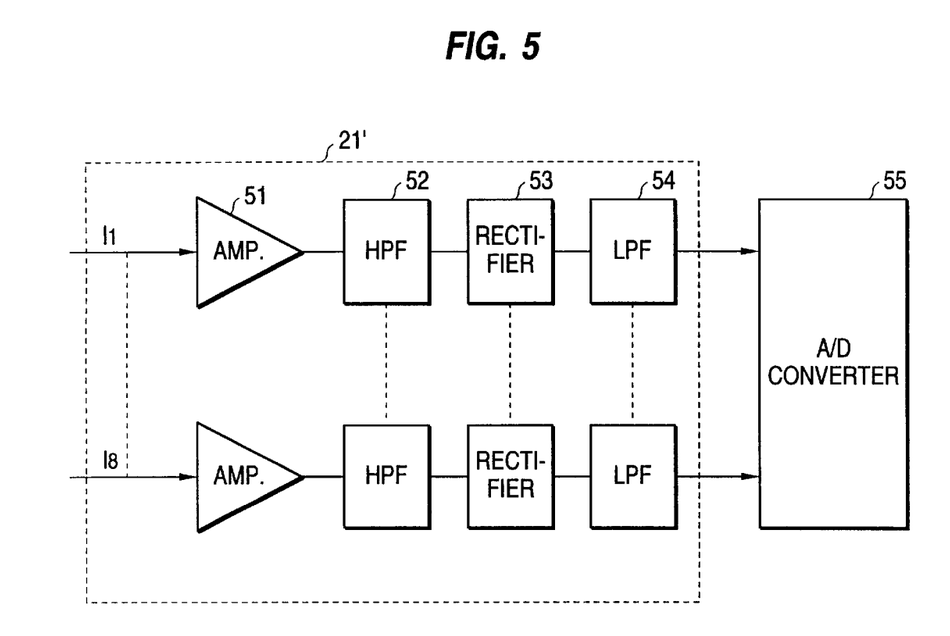
FIG. 5 is a block diagram of a multi-channel interface circuitry used in the direct pointing apparatus according to the present invention.

Both the analog filter 21 and microcontroller 22 which includes the A/D converter 23 of the A/D interface 7 are exemplified in FIG. 2 of the drawings as dashed block 7'. More specifically, each sensor is separately wired to a corresponding one of a plurality of A/D interface channels associated with the interface circuitry 7 (7'), in which case, the interface circuitry channels operate in parallel. In connection with this, FIG. 5 of the drawings shows a plural channel A/D interface circuitry for operating on analog signal values outputted by the respective light sensors, the number of channels in the A/D interface circuitry corresponding to the number of light sensors provided in the light sensing arrangement. The dashed block 21' in FIG. 5 corresponds to the analog filter portion which includes, in the example illustrated, eight channels of analog filters for the eight light sensors 5 shown in FIG. 1, which numbers were found to be quite satisfactory by the inventors. The interface circuitry, as just noted, operates in parallel (see FIG. 5). With regard to this, each IR sensor is connected to a circuit consisting of an amplifier 51, which amplifies the signal value outputted by the corresponding IR sensor, a first filter 52 which is a high-pass filter for removing the ambient light from the analog signal, a rectifier 53 and a second filter 54, which is a low-pass filter, for converting the AC signal, which is at 38 kHz in this example (although not limited thereto), to a DC signal which, in turn, is converted by the A/D converter 55. Such parallel pre-processing by the interface circuitry 7' into digital signals to be operated on by the host program of the computer serially in a simple asynchronous format is, for example, in a format recognizable by any computer supporting an RS232 serial I/O port at 9.6 K baud or 19.2 K baud. That is, according to one preferred arrangement, the A/D interface operates on parallel incoming analog signals from the IR sensors and outputs them as packaged digital values by the microcontroller and are communicated to the CPU via a serial interface in a simple asynchronous format. Of course, the interface could be any one of available (standard) types.

It should be emphasized, the converted (digital) signals are indicative of the values of signals outputted by the light receivers which, in turn, are indicative of the light intensities sensed by each of the light receivers. As noted earlier, the light emitting module is a directed light emitter which operates as a pointer aimed at a location on the computer display while being worn by the user. The IR light signal being emitted is a relatively narrow directional signal. Turning back to the host computer/CPU, the serially received signals (although other forms of digital signal transfer to the host computer would be acceptable including parallel signal transfer) are operated on in accordance with a software driver of the host computer to execute the calculations of the X-Y coordinates of the target position on the display. Details regarding the calculation will be explained in conjunction with FIGS. 7 and 8.

Turning back to the light sensing arrangement of the receiver system, the plurality of light receivers which may involve at least one light receiver (sensor) at each of the outer periphery sides and/or a light receiver at each of the corner locations of the outer periphery of the display can be either individually retrofitted or retrofitted together as a modular unit along the outer periphery of the display. Any one of available placement/fitting schemes would suffice including one in which the receivers are mounted on or contained in a rectangular-shaped modular frame, expandable in the X-Y directions for conforming to the dimensions of the display. The A/D interface can, of course, also be incorporated into the light sensing arrangement structure or, for that matter, can be a separate module. Alternatively, the receiver system can, of course, be built-into the display housing during the production stage thereof. This can be achieved through fixedly placing the sensors either individually or as a single structured unit inside the walls of the display housing with openings for the light signal to enter. Also, the A/D interfacing can be achieved through installing circuitry directed thereto during the manufacture of the unit and with regard to the software driver for effecting the X-Y coordinate calculations, this can be installed also.

Figure 3:
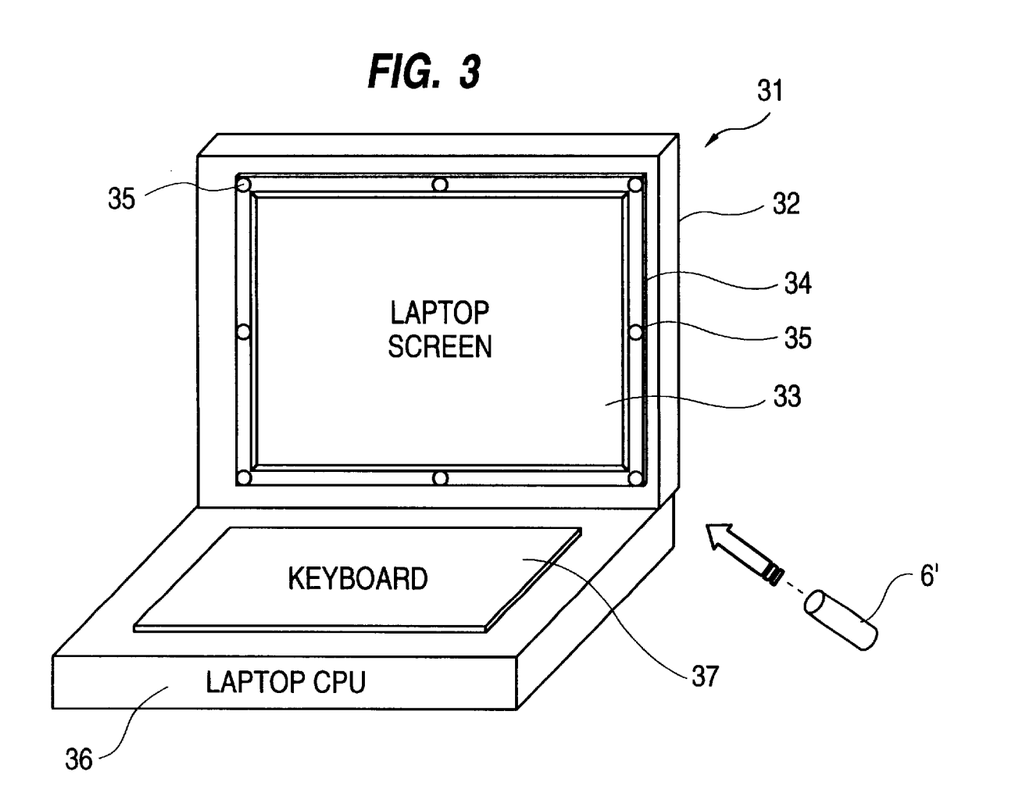
FIG. 3 shows the mounting of a light receiver frame having light sensors on a notebook computer display.

As discussed earlier, the present invention is applicable also to notebook (laptop) computers. As an example of a notebook computer facilitated with a direct pointing apparatus of the present invention, FIG. 3 is being illustrated. In FIG. 3, the receiver system is retrofitted to the notebook computer; however, it can also be built-into the display housing during the production stage thereof. (For purposes of simplicity, the A/D interface is not shown; alternatively, however, the A/D interface circuitry can be built-into the display housing.) In the notebook computer 31 of FIG. 3, 32 represents the display housing, 33 is the laptop screen, 34 represents the light receiver modular frame, 35 are the light receivers, 36 represents the laptop CPU, 37 is the keyboard and 6' is a pointer with a directed light emitter, worn by the computer user.

Figure 4:
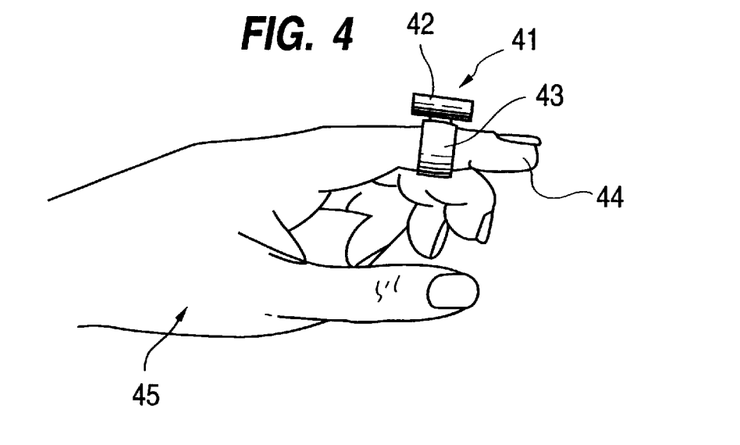
FIG. 4 is an elevational view of a finger-mounted pointing device in accordance with the present invention as worn on the hand of a computer user.

With regard to FIGS. 1 and 3, the present inventors have determined that the directed light emitter 6 (6') can be practically and efficiently used as a direct pointer by being mounted on a ring-like member worn on the finger of the computer user. This allows the computer user to keep his or her hands on the keyboard during the pointing operation. Because the index finger typically has excellent mobility and is a natural pointing device, the light emitting module, preferably, of the IR LED signal emitting type (although not limited thereto) can be mounted on the index finger as a ring-like member for use as a finger pointing device. This can be better understood from the illustration in FIG. 4 of the drawings in which reference numeral 41 designates the finger-mounted pointing module which includes a directed light emitting device (e.g., an IR LED transmitter) and a ring-like mounting member 43 of any conventional construction which is adjustable for finger size and for comfort. The ring-like adjustable mounting member 43 can be of somewhat elastic known material or can be Velcro material or, for that matter, but not limited to, can also be a strapping member, fitted around the most mobile finger, preferably, the index finger 44 of the hand 45. Mounting the light emitting device 42 in the manner as shown in FIG. 4 allows the computer user to keep from having to remove one hand from the keyboard while permitting direct pointing action through aiming the finger at a specific location on the display. With regard to using such finger pointing scheme in notebook computers, it is clearly apparent that while the hands are positioned on the keyboard of the laptop and pointing only with the index finger, the range of motion that is available to the finger-mounted pointer is more than sufficient to cover the area of a typical laptop screen. This would also be apparent with regard to a typical personal computer screen where the user has both the keyboard and the screen directly in front of him or her. Such additional advantage of pointing with the finger is highly desirable. With regard to this, also, an additional advantage of pointing with the index finger becomes apparent: since the user does not have to remove the hand from the keyboard, the user avoids the problem of alternating device acquisition, namely, switching the hand back and forth between the keyboard and a pointing device such as a mouse or trackball, etc.

Figure 6:
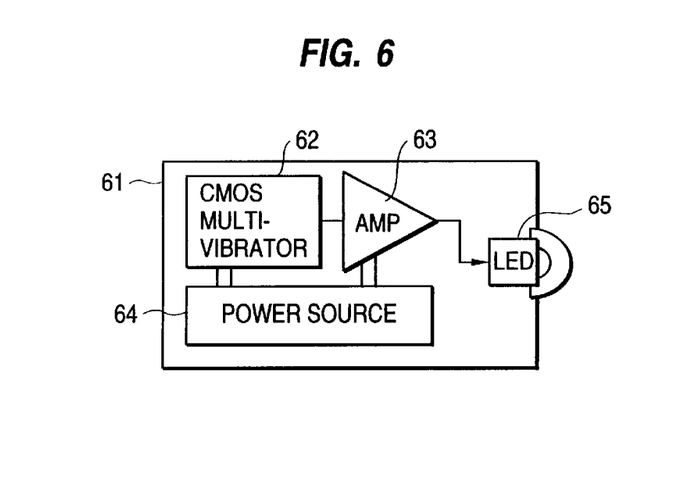
FIG. 6 is a block diagram of an IR LED transmitter used in accordance with the present invention.

In FIG. 6 of the drawings, 61 is the directed light emitting device that can be employed as the light emitting device 42 in FIG. 4 which is representative of the light emitting device of pointers 6 and 6' in FIGS. 1 and 3. The light emitting device 61 in FIG. 6 includes a CMOS multivibrator 62/amplifier 63 combination for driving an LED 65 under the switchable power control of power source (battery) 64. Under such control, the LED 65 emits light emitting pulses, in this case, IR signal pulses, as a continuous signal or light beam modulated at 38 kHz, for example. Referring back to the discussion of the A/D interface 7 (7'), the analog signal transmitted through the analog filter also has a matching AC frequency of 38 kHz which signal frequency, the inventors have found, is sufficient for discounting the ambient light present. The AC wave for carrying IR pulses from the light emitter to the light receivers as well as the AC wave for carrying the analog signal can, of course, be at a different frequency. Discussion will now turn to the actual processing operation in the host computer/CPU for calculating the X-Y coordinates of the target location on the screen.

According to a featured aspect of the invention, the location on a display at which the light emitter is pointing is computed from the intensities of light being sensed by the light receivers, the computing of the location being substantially independent of the distance of the light emitter from the light sensing arrangement. In this connection, the position on the display being pointed to by the light emitter can be indicated, for example, as a cursor or the like at that position. Using the examples shown in the drawings in which case there are eight light receivers around the outer periphery of the screen, the receiver system would consist of a small 8-bit stand-alone microcontroller unit with a built-in analog-to-digital (A/D) converter, eight analog filter units (see 21' in FIG. 5) and eight IR sensitive light activated devices (e.g., photo-transistors) along with the required wirings/connections. While the emitter sends a continuous signal at approximately 38 kHz, the receiver transistors amplify the received signal at amplifiers 51 followed by removal of the ambient light therefrom via high-pass filters 52. The filtered AC signal which is transmitted at the same 38 kHz frequency is then converted to an acceptable DC level by a combination of rectifier 53 and low-pass filter 54. This amplification/modification of the sensed signal outputted by each of the light receivers (sensors) occurs at all of the eight channels continuously and parallely. The converted DC signal is transmitted, for example, to a built-in 8-channel 8-bit A/D converter in the microcontroller (e.g., Motorola 68HC11). This A/D converter converts these signals to serially outputted asynchronous digital signals (it should be noted, however, the invention is not limited to the outputting of asynchronous serial digital signals). The microcontroller which pre-processes the data and sends it to the host computer/CPU via a serial line in a simple asynchronous format transmits the values continuously to a host computer/

CPU that can support an RS232 serial I/O port at 9.6 K baud or 19.2 K baud, where the calculations of the X-Y coordinates pertaining to the location of the target position on the screen are effected through running a host program.

As noted earlier, the X and Y coordinates, respectively, are determined as a function of the values of the light intensities at the light receivers and are substantially independent of the distance between the direct pointing device and the screen. That is, the target position calculated does not require the calculation of the relative position of the light emitter pointer. As to the method for calculating the coordinates from the intensities at the sensors, the following discussion is provided in conjunction with the example diagram in FIG. 7 and the flowchart in FIG. 8 of the drawings.

Figure 7:
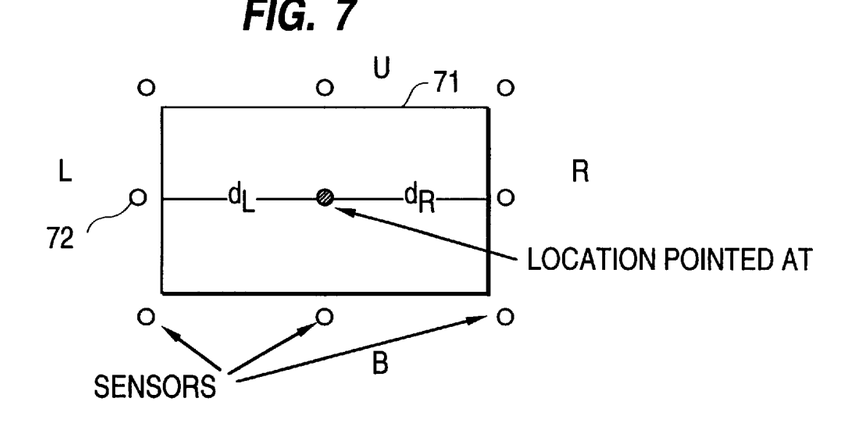
FIG. 7 is an example of an arrangement of light receivers around a display screen for purposes of explaining how the X-Y coordinates of the target location are calculated, according to the present invention.

As mentioned above, the light emitted by the pointing device (e.g., LED) is directional. Because the emitted light is directional, the location at which the emitter is pointing will, correspondingly, receive the highest intensity of light (IR signal radiation). The intensity of light received will, of course, decline in all directions on the screen from that point. Therefore, the distance of any sensor from the location of highest intensity can be said to be inversely proportional to the intensity it receives. Since the sensors 72 in FIG. 7 are located around the screen, the relative intensities of light received by sensors which are located on opposing sides of the screen will be inversely proportional to the distance of the location from each opposing side. That is, assuming the darkened sphere on the screen 71 is the location at which the pointer is aiming at, the ratio of distance $d_L$ to the distance $d_R$ is approximately the inverse of the ratio of the light intensities received by the sensors along the left side L to the intensities received by the sensors located along the right side R. By the same reasoning, the ratio of the distance $d_L$, moving from left to right, to the total distance from left side L to right side R is approximately the same as the ratio of the sum of the light intensities received by the sensors along side R to the sum of the light intensities received by the sensors along both sides L and R. Using these ratio relationships, the value of the horizontal coordinate X pertaining to the target location can be approximated as follows: let P=the horizontal resolution in pixels (e.g., 800 for an 800×600 display);

$I_R$=the sum of intensities received by the sensors located along side R;

$I_L$=the sum of intensities received by the sensors located along side L, then, the X coordinate can be calculated from the following:

$$X=P_X \cdot (I_R/(I_L+I_R)) \quad (1.0)$$

However, according to the present invention, because the sensors would typically be located slightly outside the screen, we also need to take into consideration the effective extended screen size, that is, we need to extend the coordinate resolution slightly to account for the larger distance. The present inventors have determined that extending the coordinate resolution slightly, for example, say 10%, works very well in this scheme. Therefore, applying this effective extension of the coordinate resolution to Equation 1.0 above, that equation now becomes:

$$X'=1.1 P_X \cdot (I_R/(I_L+I_R)) \quad (1.1)$$

It is noted, however, that this extension has the effect of shifting everything by 10% or by 0.1 $P_X$ to the right. Accordingly, during the calculation, the X coordinate must then be re-centered to the more accurate position on the screen. This is effected by subtracting half of the total 10% shifting, namely, 0.05 $P_X$. This re-centering is incorporated into Equation 1.1 which now becomes:

$$X''=1.1 P_X \cdot (I_R/(I_L+I_R))-0.05 P_X \quad (1.2)$$

Equation 1.2 is accurately representative of the X coordinate of the location of the target position on the screen.

In the same way, the equation for the Y coordinate is obtainable. That is, since the light received by each of the sensors declines in all directions on the screen away from that point, the calculation of the Y coordinate of the location of the target position on the screen is also just as easily determined. That is, in Equation 1.2 above, the X values are replaced by Y value intensities in which case the Y coordinate of the location of the target position is calculated from the following:

$$Y=1.1 P_Y \cdot (I_U/(I_B+I_U))-0.05 P_Y \quad (1.3)$$

where $P_Y$=the vertical resolution in pixels;
$I_B$=the sum of the intensities received by the sensors along the bottom side B;
$I_U$=the sum of the intensities received by the sensors along the upper side U.

Figure 8:
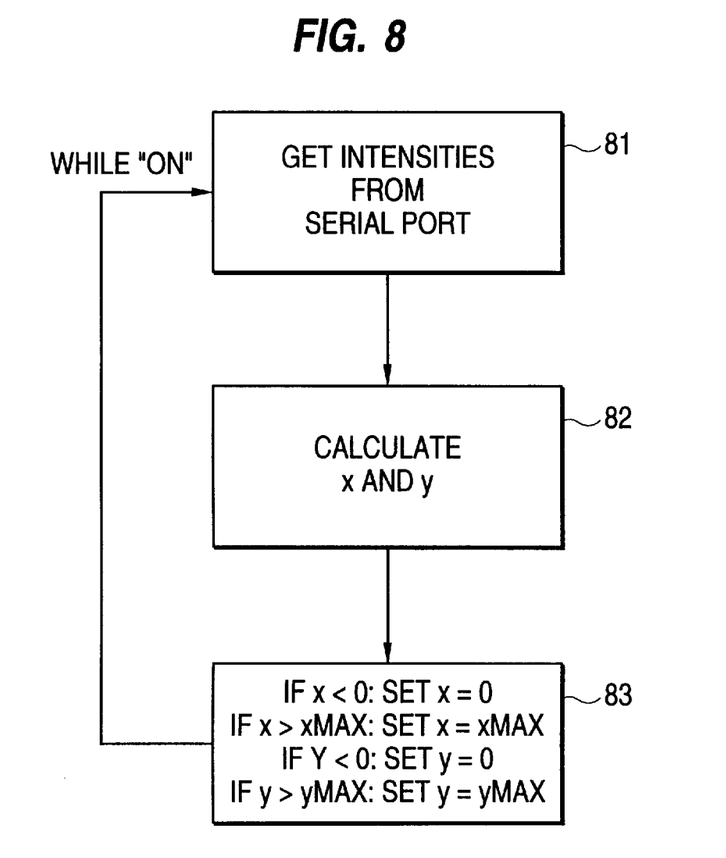
FIG. 8 is a flowchart for calculating the X and Y coordinates in accordance with the present invention.

We have embodied these calculations in a software driver which executes on the CPU (although the calculations could also be done on the microprocessor that is used for the microcontroller). The flowchart depicted in FIG. 8 is exemplary of the process for effecting the calculation. In this connection, when the direct pointing apparatus is activated, in which case continuous location tracking is effected, the intensity values received by the CPU via the serial port are stored in a storage array (step 81). These intensity values which are stored as digital values are used to calculate the X and Y coordinates in accordance with Equations 1.2 and 1.3 (step 82). Because of the resolution expansion associated with Equations 1.2 and 1.3, namely, the added-on 10% effective screen size, for purposes of a more accurate calculation of the X and Y coordinates, and because there exists possible imprecise calculations being performed by the computer, namely, there is the possibility that the results may be negative or greater than the maximum resolution, we determined that we must also take into account such possibilities. Therefore, should either a negative result or a result that is greater than the maximum resolution be calculated, then such values must either be re-set to either 0 or $P_X(P_Y)$ In this example, $P_X$=800 and $P_Y$=600. These results are stored in a globally available location in the computer. One must then continue to repeat this until tracking is turned off.

Incidentally, because the minimum value of light received at the sensors located on the left side (right side) is typically not 0 when the LED is pointing directly on the right side (left side) sensors, it is also necessary to modify the intensity values so that the minimum value, that is, the threshold value is taken into account also. This is achieved by subtracting the minimum intensity value or threshold value from each intensity value then dividing the result by the range from the minimum to maximum values. The resulting values are then in a normalized range of from 0 to 1. In connection with this, let:

$I_i$=the intensity measured at a sensor i
$I_{max}$=the maximum intensity measurable at i (the emitter is pointed directly at i)
$I_{min}$=the minimum intensity measurable at i (the emitter is pointed away from sensor i, usually pointed on the opposing side of the screen)

then:

$$I_i=(I_i-I_{max})/(I_{max}-I_{min}) \quad (2.0)$$

Applying this to Equations 1.2 and 1.3 above, the normalized light intensities at each of the sensors is taken into account also. In this connection, the minimum and maximum intensities for the sensors need only be measured once for each configuration. That is, according to this scheme, the calculated X and Y coordinates would always be positive values within the pixel resolution of the screen.

The following program which uses C source code embodies the calculations for the X-Y coordinates of the location of the target position on the screen, in which case the lower left-hand corner of the screen is presumed to be the X-Y coordinates origin (0,0):

```
// a[2], a[7], a[3] are intensities from right side sensors,
     a[4], a[0], a[5] from left
// determine X coordinate
X = -40+880*((a[2]+a[7]+a[3])/
     (a[2]+a[7]+a[3]+a[4]+a[0]+a[5]));
// a[5], a[1], a[3] are intensities from top side sensors,
     a[4], a[6], a[2] from bottom
// determine Y coordinate
Y = -30+660*((a[5]+a[1]+a[3])/
     (a[5]+a[1]+a[3]+a[4]+a[6]+a[2]));
if(X<0) X=0;              // safeguard the values
if(X>800) X=800;
if(Y<0) Y=0;
if(Y>600) Y=600;
newLocation.x=X;          // update the global values
newLocation.y=Y;
```

You will note that in this program, all calculated values of X (Y)<0 are reverted to 0 and all X (Y) values>$X_{max}$ ($Y_{max}$) are reverted to $X_{max}$ ($Y_{max}$) coordinate (see step 83). Clearly; therefore, the present direct pointing scheme not only can be practically implemented and at a low cost especially when mass-produced but, operates on a quite simple principle, basically, involving the intensities of the light being sensed by the individual light receivers which intensity is normalized to have a value of from 0 to 1, 1 representing a maximum intensity value and 0 representing a minimum threshold value or less. The computation of the coordinates is also substantially independent of the distance of the light emitter pointing device from the sensing arrangement, that is, the target position does not require locating the position of the pointer.

Figure 9:
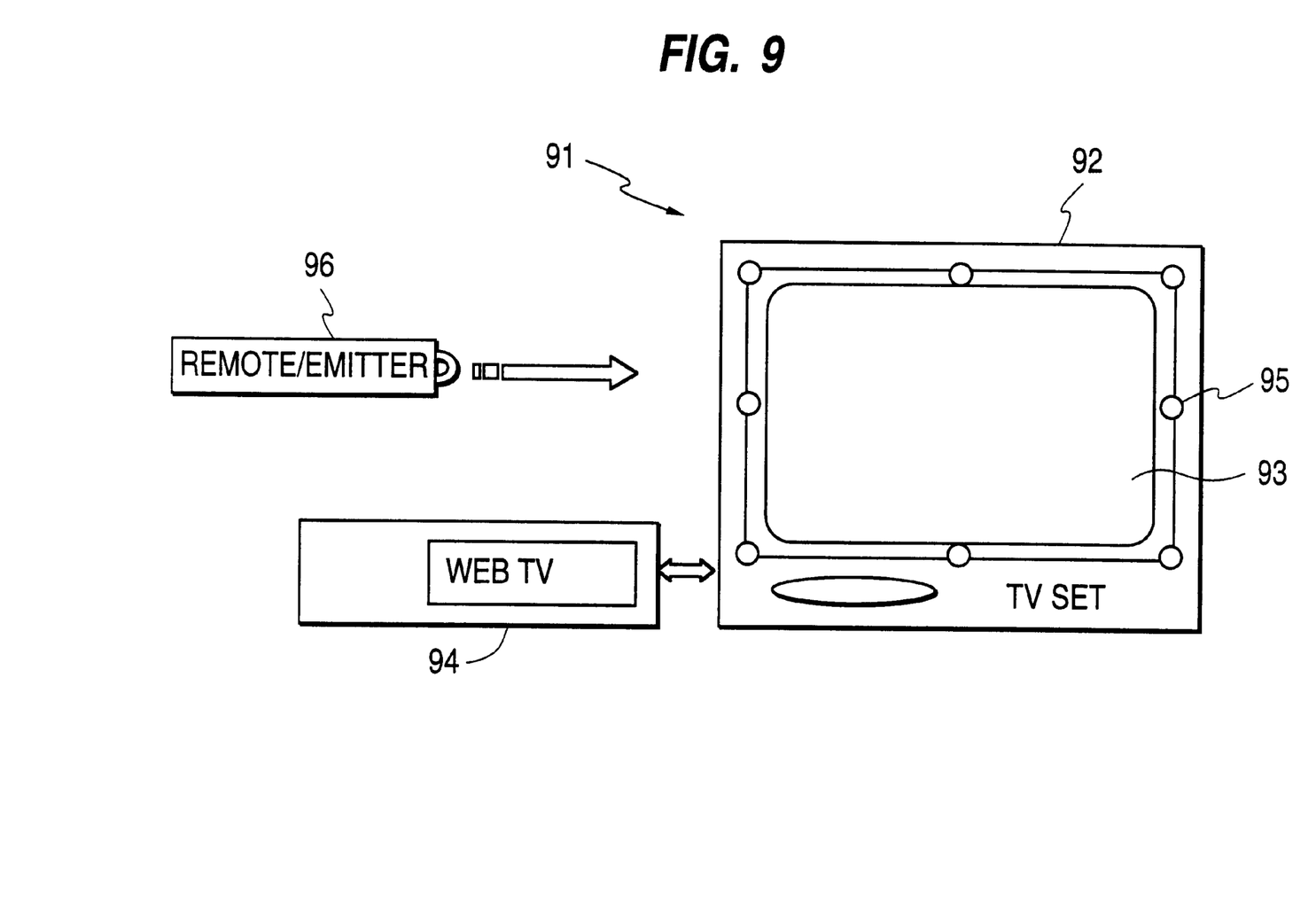
FIG. 9 is an application of the direct pointing apparatus and method therefor of the present invention to interactive television.

The present invention can also be applied to interactive television (WEB TV), such as shown in the block diagram of FIG. 9. In this connection, the receiver system can be implemented in the same manner as that with regard to the computer display. However, as to the direct pointer, that can be built-into the remote control unit for the WEB TV. According to the direct pointing scheme of the present invention for interactive television, the light emitting module (an IR LED transmitter) is adapted to operate as a pointer by aiming the remote control unit (which is facilitated with circuitry for the pointer) at a location on the TV screen 93. That is, the remote control device 96 which is used as a program controller can be facilitated as a direct pointing device through using an already built-in LED in the remote control device as a direct pointer. In this connection, the circuitry part of the light emitting diode of the target pointer 96 associated with the computer display (see FIG. 6) can be designed also into the remote control device circuitry whereby during operation of the pointer, the pointer circuitry, for example, can be activated through a push-button control or other means. In the illustration in FIG. 9, 91 represents the overall interactive television system (WEB TV), 92 is the TV set console, 93 represents the TV screen, 94 represents the WEB TV control unit which can include a special purpose computer and be facilitated with other components including a VCR and a laser disk component and which can feature internet communication and the like. The console can also be manufactured to include the special purpose computer for WEB TV including modems for internet communication. As discussed earlier with regard to computer system applications, the receiver system of the direct pointing apparatus can be built-into the console of the television or be retrofitted in connection with already existing units. This wide range of application of the improved direct pointing scheme of applicants' invention and, therefore, its portability thereof is very desirable.

It is submitted the present description as it relates to the accompanying illustrated embodiments is merely illustrative and that various modifications as well as alternative arrangements are possible according to the present invention. That is, the present invention is not limited to the embodiments/examples described in this specification and illustrated in the accompanying drawings but, rather, the invention covers various other and obvious modifications thereof as well as different embodiments that fall within the scope of the appended claims.

What is claimed is:

1. A direct pointing apparatus, comprising:
   a light emitting module adapted to operate as a pointer aimed at a location on a computer display while being worn by a user of the computer;
   a light sensing arrangement having a plurality of light receivers positioned around the outer periphery of the display; and
   interface circuitry which couples said light receivers to a host computer for processing converted signals, said converted signals being indicative of the value of signals outputted by said light receivers, respectively,
   wherein said light emitting module includes a directed light emitter used for indicating a target position on the display through pointing the light emitter at that position,
   wherein the location on the display at which said light emitter is pointing is computed from the intensities of light being sensed by the light receivers, the computing of said location being substantially independent of the distance of said light emitter from said light sensing arrangement, and
   wherein said interface circuitry filters ambient light and converts analog signals, indicative of signals outputted by said light receivers, into digital signals processed by the computer, through running a host program by the computer, to determine X and Y coordinates of said target position, the X and Y coordinates, respectively, being a function of the values of the light intensities at the light receivers and are determined in accordance with the following relationships, operated on by the computer under the control of said host program:

$$X=(1+K_X)P_{X'}(I_R/(I_L+I_R))-(K_X/2)P_X; \text{ and} \quad (i)$$
   $$Y=(1+K_Y)P_{Y'}(I_B/(I_B+I_U))-(K_Y/2)P_Y \quad (ii)$$

where $P_X(P_Y)$=the horizontal (vertical) resolution in pixels of the display,
   1+$K_X$(1+$K_Y$) is a constant multiplier that takes into account the additional pixel distance effected by the placement of the light receivers outside the pixel display area, $I_R(I_L)$=the sum of light intensities received by the light receivers located along the right vertical (left vertical) of the display, $I_U(I_B)$=the sum of light intensities received by the light receivers located along the upper horizontal (lower horizontal) of the display, the light intensity of each sensor having a normalized weight of from 0 to 1, and $(K_X/2)P_X((K_Y/2)P_Y)$=half the additional pixel distance along the X (Y) direction.

2. A direct pointing apparatus according to claim 1, wherein the position on the display being pointed to by the light emitter is indicated by appearance of a cursor at that position.

3. A direct pointing apparatus according to claim 1, wherein said light sensing arrangement has at least one light receiver disposed at each side of the outer periphery of said computer display.

4. A direct pointing apparatus according to claim 3, wherein said light sensing arrangement further has a light receiver disposed at each corner location of the outer periphery of said computer display.

5. A direct pointing apparatus according to claim 1, wherein said light sensing arrangement has a light receiver disposed at each corner location of the outer periphery of said computer display.

6. A direct pointing apparatus according to claim 1, wherein said light sensing arrangement and said interface circuitry constitute a receiver system retrofitted to said computer display.

7. A direct pointing apparatus according to claim 1, wherein said light sensing arrangement and said interface circuitry are built-into a housing of said computer display.

8. A direct pointing apparatus according to claim 1, wherein said directed light emitter is an infrared LED transmitter and said light sensors are infrared light-activated devices, respectively.

9. A direct pointing apparatus according to claim 1, wherein the display and said host computer together constitute a notebook computer.

10. A direct pointing apparatus according to claim 1, wherein said light emitting module is mounted on a ring-like member worn on a finger of the computer user so as to operate as a finger pointing device.

11. A direct pointing apparatus for interactive television, comprising:

a remote control device facilitated as a program controller and as a direct pointing device, said direct pointing device having a light emitter adapted to operate as a pointer aimed at a location on the television display; and a receiver system including a light sensing arrangement having a plurality of light receivers positioned around the outer periphery of the display and interface circuitry which couples said light receivers to a host computer for processing converted signals indicative of the value of signals outputted by said light receivers, respectively, wherein said light emitter is a directed light emitter used for indicating a target position on the display through pointing the light emitter at that position, wherein the location on the display at which said light emitter is pointing is computed from the intensities of light being sensed by the light receivers, the computing of said location being substantially independent of the distance of said light emitter from said light sensing arrangement, and wherein said interface circuitry filters ambient light and converts analog signals, indicative of signals outputted by said light receivers, into digital signals processed by the computer, through running a host Program by the computer, to determine X and Y coordinates of said target position, the X and Y coordinates, respectively, being a function of the values of the light intensities at the light receivers and are determined in accordance with the following relationships, operated on by the host computer under the control of said host program:

$$X=(1+K_X)P_X \cdot (I_R/(I_L+I_R))-(K_X/2)P_X; \text{ and} \quad (i)$$

$$Y=(1+K_Y)P_Y \cdot (I_B/(I_B+I_U))-(K_Y/2)P_Y \quad (ii)$$

where $P_X(P_Y)$=the horizontal (vertical) resolution in pixels of the display, $1+K_X(1+K_Y)$ is a constant multiplier that takes into account the additional pixel distance effected by the placement of the light receivers outside the pixel display area, $I_R(I_L)$=the sum of light intensities received by the light receivers located along the right vertical (left vertical) of the display, $I_U(I_B)$=the sum of light intensities received by the light receivers located along the upper horizontal (lower horizontal) of the display, the light intensity of each sensor having a normalized weight of from 0 to 1, and $(K_X/2)P_X((K_Y/2)P_Y)$=half the additional pixel distance along the X (Y) direction.

12. A direct pointing apparatus according to claim 11, wherein the position on the display being pointed to by the light emitter is indicated by appearance of a cursor at that position.

13. A direct pointing apparatus according to claim 11, wherein said light sensing arrangement has at least one light receiver disposed at each side of the outer periphery of said computer display.

14. A direct pointing apparatus according to claim 13, wherein said light sensing arrangement further has a light receiver disposed at each corner location of the outer periphery of said computer display.

15. A direct pointing apparatus according to claim 11, wherein said light sensing arrangement has a light receiver disposed at each corner location of the outer periphery of said computer display.

16. A direct pointing apparatus according to claim 11, wherein said light receiver system is retrofitted to said computer display.

17. A direct pointing apparatus according to claim 11, wherein said light receiver system is built-into a housing of said computer display.

18. A direct pointing apparatus according to claim 11, wherein said directed light emitter is an infrared LED transmitter and said light sensors are infrared light-activated devices, respectively.

19. A direct pointing method, comprising the steps of:

adapting a light emitting module to operate as a pointer aimed at a location on a computer display while being worn by a user of the computer;

arranging a plurality of light receivers around the outer periphery of the display; and changing signal values outputted by said light receivers into converted signals to be operated on by a host computer, the signal values outputted by said light receivers being indicative of the light intensities sensed by the respective light receivers, wherein said light emitting module is provided with a directed light emitter for indicating a target position on the display through pointing the light emitter at that position, wherein the location on the display at which said light emitter is pointing is computed from the intensities of light being sensed by the light receivers, the computing of said location being substantially independent of the distance of said light emitter from said light sensing arrangement, and wherein the signal values outputted from the light receivers are filtered for ambient light and are converted into digital signals to be processed by the computer, through running a host program by the computer, to determine X and Y coordinates of said target position, the X and Y coordinates, respectively, being a function of the values of the light intensities at the light receivers and are determined in accordance with the following relationships, operated on by the computer under the control of said host program:

$$X=(1+K_X)P_X \cdot (I_R/(I_L+I_R))-(K_X/2)P_X; \text{ and} \qquad (i)$$

$$Y=(1+K_Y)P_Y \cdot (I_B/(I_B+I_U))-(K_Y/2)P_Y \qquad (ii)$$

where $P_X(P_Y)$=the horizontal (vertical) resolution in pixels of the display, $1+K_X(1+K_Y)$ is a constant multiplier that takes into account the additional pixel distance effected by the placement of the light receivers outside the pixel display area, $I_R(I_L)$=the sum of light intensities received by the light receivers located alone the right vertical (left vertical) of the display, $I_U(I_B)$=the sum of light intensities received by the light receivers located along the upper horizontal (lower horizontal) of the display, the light intensity of each sensor having a normalized weight of from 0 to 1, and $(K_X/2)P_X((K_Y/2)P_Y)$=half the additional pixel distance along the X (Y) direction.

20. A direct pointing method according to claim 19, wherein the position on the display being pointed to by the light emitter is indicated by appearance of a cursor at that position.

21. A direct pointing method according to claim 19, wherein at least one light receiver is provided at each side of the outer periphery of said computer display.

22. A direct pointing method according to claim 21, wherein a light receiver is further provided at each corner location of the outer periphery of said computer display.

23. A direct pointing method according to claim 19, wherein a light receiver is provided at each corner location of the outer periphery of said computer display.

24. A direct pointing method according to claim 19, wherein said directed light emitter is an infrared LED transmitter and said light sensors are infrared light-activated devices, respectively.

25. A direct pointing method according to claim 19, wherein the display and said host computer together constitute a notebook computer.

26. A direct pointing method according to claim 19, wherein said light emitting module is mounted on a ring-like member worn on a finger of the computer user so as to operate as a finger pointing device.

27. A direct pointing method for interactive television, comprising the steps of:

facilitating a program controller to operate also as a direct pointing device, said direct pointing device having a light emitter adapted to operate as a pointer aimed at a location on the television display;

arranging a plurality of light receivers around the outer periphery of the display; and changing signal values outputted by said light receivers into converted signals to be operated on by a host computer, said signal values outputted by said light receivers being indicative of light intensities sensed by the respective light receivers;

wherein said light emitter is a directed light emitter used for indicating a target position on the display through pointing the light emitter at that position, wherein the location on the display at which said light emitter is pointing is computed from the intensities of light being sensed by the light receivers, the computing of said location being substantially independent of the distance of said light emitter from said light sensing arrangement, and wherein the signal values outputted from the light receivers are filtered for ambient light and are converted into digital signals to be processed by the computer, through running a host program by the computer, to determine X and Y coordinates of said target position, the X and Y coordinates, respectively, being a function of the values of the light intensities at the light receivers and are determined in accordance with the following relationships, operated on by the host computer under the control of said host program:

$$X=(1+K_X)P_X \cdot (I_R/(I_L+I_R))-(K_X/2)P_X; \text{ and} \qquad (i)$$

$$Y=(1+K_Y)P_Y \cdot (I_B/(I_B+I_U))-(K_Y/2)P_Y \qquad (ii)$$

where $P_X(P_Y)$=the horizontal (vertical) resolution in pixels of the display, $1+K_X(1+K_Y)$ is a constant multiplier that takes into account the additional pixel distance effected by the placement of the light receivers outside the pixel display area, $I_R(I_L)$=the sum of light intensities received by the light receivers located along the right vertical (left vertical) of the display, $I_U(I_B)$=the sum of light intensities received by the light receivers located along the upper horizontal (lower horizontal) of the display, the light intensity of each sensor having a normalized weight of from 0 to 1, and $(K_X/2)P_X((K_Y/2P_Y)=$half the additional pixel distance along the X (Y) direction.

28. A direct pointing method according to claim 27, wherein the position on the display being pointed to by the light emitter is indicated by appearance of a cursor at that position.

29. A direct pointing method according to claim 27, wherein said light sensing arrangement has at least one light receiver disposed at each side of the outer periphery of said computer display.

30. A direct pointing method according to claim 29, wherein said light sensing arrangement further has a light receiver disposed at each corner location of the outer periphery of said computer display.

31. A direct pointing method according to claim 27, wherein said light sensing arrangement has a light receiver disposed at each corner location of the outer periphery of said computer display.

32. A direct pointing method according to claim 27, wherein said directed light emitter is an infrared LED transmitter and said light sensors are infrared light-activated devices, respectively.

* * * * *